(12) United States Patent
Blok et al.

(10) Patent No.: US 8,653,195 B2
(45) Date of Patent: Feb. 18, 2014

(54) HYDROCARBON POLYMER MODIFIERS FOR ELASTOMERIC COMPOSITIONS

(75) Inventors: Edward J. Blok, Wadsworth, OH (US); Anthony Jay Dias, Houston, TX (US); Robert J. Claassen, II, Baytown, TX (US); Thomas R. Barbee, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/822,651

(22) PCT Filed: Aug. 17, 2011

(86) PCT No.: PCT/US2011/048049
§ 371 (c)(1),
(2), (4) Date: Apr. 4, 2013

(87) PCT Pub. No.: WO2012/050657
PCT Pub. Date: Apr. 19, 2012

(65) Prior Publication Data
US 2013/0184397 A1   Jul. 18, 2013

Related U.S. Application Data

(60) Provisional application No. 61/392,751, filed on Oct. 13, 2010.

(51) Int. Cl.
*C08F 8/00* (2006.01)
*C08L 9/00* (2006.01)
*C08L 25/02* (2006.01)
*C08L 45/00* (2006.01)

(52) U.S. Cl.
USPC ............ 525/191; 525/216; 525/232; 525/241

(58) Field of Classification Search
USPC .................................. 525/191, 216, 232, 241
See application file for complete search history.

(56) References Cited

U.S. PATENT DOCUMENTS

| | | | |
|---|---|---|---|
| 3,574,792 A * | 4/1971 | Hayashi ........................ | 525/211 |
| 3,607,829 A | 9/1971 | Harris | |
| 3,784,530 A | 1/1974 | Osborn et al. | |
| 3,846,352 A | 11/1974 | Bullard et al. | |
| 4,010,140 A | 3/1977 | Bullard et al. | |
| 4,038,346 A | 7/1977 | Feeney | |
| 5,901,766 A | 5/1999 | Sandstrom et al. | |
| 6,214,919 B1 | 4/2001 | Schlademan et al. | |
| 6,232,418 B1 | 5/2001 | Macedo et al. | |
| 6,242,523 B1 | 6/2001 | Blok et al. | |
| 6,403,743 B1 | 6/2002 | Clark et al. | |
| 6,455,652 B2 | 9/2002 | Macedo et al. | |
| 6,479,598 B1 | 11/2002 | Lewtas et al. | |
| 6,646,067 B2 | 11/2003 | Lewtas et al. | |
| 6,825,302 B1 | 11/2004 | Cottman et al. | |
| 6,867,267 B2 | 3/2005 | Lewtas et al. | |
| 2001/0031847 A1 | 10/2001 | Macedo et al. | |
| 2003/0194271 A1 | 10/2003 | Solon | |
| 2004/0092644 A1 | 5/2004 | Labauze | |
| 2004/0122157 A1 | 6/2004 | Labauze | |
| 2005/0014713 A1 | 1/2005 | Freier | |
| 2007/0149689 A1 | 6/2007 | Wang et al. | |
| 2009/0005493 A1 | 1/2009 | Tse | |
| 2009/0186965 A1 * | 7/2009 | Rodgers et al. ................ | 524/52 |

FOREIGN PATENT DOCUMENTS

| | | |
|---|---|---|
| EP | 1514901 | 3/2005 |
| JP | 05/287126 | 11/1993 |
| JP | 09/328577 | 12/1997 |
| JP | 10/204216 | 8/1998 |
| JP | 2000/256515 | 9/2000 |
| JP | 2001/348461 | 12/2001 |
| JP | 2003/253051 | 9/2003 |
| JP | 2005/213486 | 8/2005 |
| KR | 2007/004255 | 1/2007 |
| RU | 765304 | 9/1980 |
| WO | 98/57999 | 12/1998 |
| WO | 2004/009700 | 1/2004 |
| WO | 2004/044051 | 5/2004 |

* cited by examiner

*Primary Examiner* — Nathan M Nutter

(57) ABSTRACT

An elastomeric composition incorporating a hydrocarbon polymer modifier including piperylene, cyclic pentadiene and aromatic components, and having a softening point from 80° C. to 160° C., z-average molecular weight greater than 10,000, and at least 1 mole percent aromatic hydrogen, based on the total moles of hydrogen in the modifier. In a method, the elastomeric composition is processed with a cure package into a composition in the desired shape, which is cured to form the article. The modifier may optionally be immiscible with an elastomer in the composition and/or co-cured with the elastomer or filler in the composition. A tire or tire component may include the elastomeric composition.

23 Claims, No Drawings

HYDROCARBON POLYMER MODIFIERS FOR ELASTOMERIC COMPOSITIONS

PRIORITY CLAIM TO RELATED APPLICATIONS

This application is a National Stage Application of International Application No. PCT/US2011/048049 filed Aug. 17, 2011, which claims priority to and the benefit of U.S. Provisional Application Ser. No. 61/392,751, which was filed Oct. 13, 2010, both of which are fully incorporated herein by reference in their entireties.

CROSS REFERENCE TO RELATED APPLICATIONS

This application is related to U.S. application Ser. No. 12/345,154, filed Dec. 29, 2008, which claims priority to and the benefit of U.S. Provisional Application Ser. No. 61/022,122, filed Jan. 18, 2008. This patent application is also related to U.S. Provisional Application Ser. No. 61/392,765, entitled "Hydrocarbon Polymer Modifiers" filed Oct. 13, 2010.

BACKGROUND (1) Field of the Invention

This invention relates to hydrocarbon polymer modifiers and their use in elastomeric compositions. More particularly, this invention relates to the use of hydrocarbon polymer modifiers in cured elastomeric compositions.

(2) Description of Related Art Including Information Disclosed under 37 CFR 1.97 and 1.98

Elastomeric compositions are used in a wide variety of applications, including tire components such as treads and sidewalls, hoses, belts, footwear components, and vibration isolation devices. The selection of ingredients for the commercial formulation of an elastomeric composition depends upon the balance of properties desired, the application, and the end use for the particular application.

For example, in the tire industry the balance between processing properties of the green (uncured) composition in the tire plant and in-service performance of the cured rubber tire composite is of particular importance. Conventional oil processing aids have been used in many tire components: tread compounds often contain polybutadiene rubber ("BR"), oil-extended polybutadiene rubber ("OE-BR"), styrene-butadiene rubber ("SBR"), oil-extended styrene-butadiene rubber ("OE-SBR"), isoprene-butadiene rubber ("IBR"), and styrene-isoprene-butadiene rubber ("SIBR"); sidewall and ply coats can contain butyl rubber and SBR and have used free aromatic oils as processing aids; internal components, such as the steel belt skim coat, gum strips, cushions, barriers, bases, and wedges, contain predominantly natural rubber and have used aromatic oils.

Generally, the raw ingredients and materials used in tire compounding impact all tire performance variables, thus, any new alternative to conventional processing oils must be compatible with the rubbers, not interfere with cure, be easily dispersed in all tire compounds, be cost effective, and not adversely impact tire performance. Rolling resistance, dry and wet skid characteristics, heat buildup, and so on are important performance characteristics, as well as the ability to improve the endurance of tires used in a wide variety of conditions, such as is required for agricultural tires, aircraft tires, earthmover tires, heavy-duty truck tires, mining tires, motorcycle tires, medium truck tires, and passenger car tires. On the other hand, maintaining ease of processability of the uncured elastomeric composition is also of significant importance. Additionally, the goals of improving air impermeability properties, flex fatigue properties, and the adhesion of the elastomeric composition to adjoining tire components without affecting the processability of the uncured elastomeric composition or while maintaining or improving the physical property performance of the cured elastomeric composition still remain.

Conventionally, various processing oils, such as naphthenic, paraffinic, and aromatic oils, have been added to most tire components to aid compound processing. Aromatic oil has been preferred due to its processing effectiveness and beneficial secondary properties, e.g., adhesion. However, these processing oils, particularly aromatic oils containing distilled aromatic extracts, are being replaced due to health, safety, and environmental concerns. For example, European Union Directive 2005/69/EC required the reduction of polycyclic aromatic hydrocarbons ("PAH") in passenger car tires, light and heavy truck tires, agricultural tires, and motorcycle tires as of Jan. 1, 2010. Thus, rubber compounders have been replacing prior aromatic oils used in oil-extended ("OE") rubbers with alternative oils or processing aids.

It is also known to improve tire tread performance by compounding amorphous or semicrystalline resins in the rubber base to improve tire performance, e.g., aliphatic resins having a high glass transition temperature (Tg). These materials can be miscible, which increases compound Tg for better wet traction, have some degree of immiscibility, which broadens compound Tg in wet traction region, or be immiscible in one or all of the polymers used, which has relatively no effect on the compound Tg. The immiscibility can be demonstrated by independent Tg peaks for the two different phases, i.e., the Tg corresponding to the rubber phase is not significantly changed by the immiscible resin. Tread compositions based on these formulations can have a low rolling resistance at normal use temperatures and/or a high grip at high temperature or "borderline" conditions.

In all cases, increasing the permanence of the oil, resin or other rubber compounding additive is important. Unfortunately, low molecular weight additives in general and immiscible resins in particular can migrate to the surface of the tread or other tire components over time, which can dramatically change the rubber compound characteristics and/or tire performance over its life. There is thus a need for improving the permanence of rubber compounding additives.

SUMMARY

The present invention provides an elastomeric composition comprising at least one hydrocarbon polymer modifier ("HPM"). The elastomeric compositions of the present invention are useful in a variety of applications such as pneumatic tire components, hoses, belts, solid tires, footwear components, rollers for graphic arts applications, vibration isolation devices, pharmaceutical devices, adhesives, sealants, protective coatings, and bladders for fluid retention and curing purposes.

In one embodiment, the HPM comprises an interpolymer of a piperylene component, a cyclic pentadiene component, and an aromatic component. In an embodiment, the interpolymer has one or more of the following properties: a softening point from 80° C. to 160° C., z-average molecular weight greater than 10,000, and at least 1 mole percent aromatic hydrogen based on the total moles of hydrogen in the interpolymer. Alternatively or additionally, the interpolymer may have one or more of a softening point from 110° C. to 150° C., number average molecular weight greater than 800, weight average molecular weight greater than 2500, z average molecular weight greater than 20,000, at least 5 mole percent aromatic hydrogen and/or at least 1 mole percent olefinic hydrogen based on the total moles of hydrogen in the interpolymer.

In one embodiment, the HPM is obtained by carbocationic interpolymerization from a monomer mixture comprising from 1 to 60 wt % of the piperylene component, from 5 to 50 wt % of the cyclic pentadiene component, and from 1 to 60 wt % of the aromatic component, by total weight of monomers in the monomer mixture. In an embodiment, the cyclic pentadiene component in the monomer mixture includes at least 10 mole percent of dimers, trimers, codimers, and cotrimers, by total moles of the cyclic pentadiene component in the monomer mixture. Optionally, the HPM may also comprise an amylene component.

In an embodiment, the interpolymer is immiscible with the at least one elastomer.

In an embodiment, the elastomeric mixture may comprise filler, wherein the interpolymer is able to form a chemical bond with the filler. Alternatively or additionally, the interpolymer may have reactive sites capable of co-curing with an elastomeric component in the composition.

In another embodiment, a tire or tire component comprises the elastomeric composition.

In another embodiment, a method comprises melt processing an elastomeric mixture to form a green elastomeric composition in the shape of an article, wherein the elastomeric mixture comprises the elastomeric composition described above and a cure package, and curing the green elastomeric composition to form the article. In an embodiment, the HPM is present in the elastomeric mixture in an amount effective to lower the Mooney viscosity.

In an embodiment, the method comprises adhering a build component to a surface of the green elastomeric composition, and co-curing the build component with the article to form a construct. For example, the construct may be a tire and the article may be a tire tread, a tire innerliner, a tire carcass or the like. In an embodiment, the green elastomeric composition has a tack to the build component of at least 5N.

In a further embodiment, an elastomeric composition comprises at least one elastomer and at least one hydrocarbon polymer modifier comprising an interpolymer of (i) from 10 to 80 wt % units derived from at least one piperylene component; (ii) from 15 to 50 wt % units derived from at least one cyclic pentadiene component; and (iii) from 10 to 30 wt % units derived from at least one styrenic component, wherein the interpolymer has (a) a softening point from 80° C. to 160° C., (b) z-average molecular weight greater than 10,000, (c) at least 1 mole percent olefinic hydrogen, based on the total moles of hydrogen in the interpolymer, and (d) at least 5 mole percent aromatic hydrogen, based on the total moles of hydrogen in the interpolymer.

These and other objects, features, and advantages will become apparent as reference is made to the following detailed description, preferred embodiments, examples, and appended claims.

DETAILED DESCRIPTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber by weight, and is a measure common in the art wherein components of a composition are measured relative to the total of all of the elastomer (rubber) components. The total phr or parts for all rubber components, whether one, two, three, or more different rubber components are present in a given recipe is always defined as 100 phr. Other non-rubber components are generally proportional to the 100 parts of rubber and the relative amounts may be expressed in phr.

All hydrocarbon polymer modifier component percentages listed herein are weight percentages, unless otherwise noted. "Substantially free" of a particular component in reference to a composition is defined to mean that the particular component comprises less than 0.5 weight percent in the composition, or more preferably less than 0.25 weight percent of the component in the composition, or most preferably less than 0.1 weight percent of the component in the composition.

The term "elastomer", as used herein, refers to any polymer or combination of polymers consistent with the ASTM D1566 definition, incorporated herein by reference. As used herein, the term "elastomer" may be used interchangeably with the term "rubber."

As used herein, "immiscibility" is present when experimental techniques to observe the glass transition temperature (Tg) show distinct separate and independent peaks for the elastomer and the interpolymer. Miscible systems on the other hand generally result in a single Tg peak which is shifted from the Tg peak for the elastomer alone, or which has a shoulder, due to the presence of the miscible interpolymer in the elastomer phase. Tg can be determined by differential scanning calorimetry ("DSC").

The elastomeric compositions of the invention can include various elastomers, hydrocarbon polymer modifiers, and fillers. In one embodiment, a single one or a mixture of two or more of the various elastomers are generally present in the elastomeric composition at 100 phr with hydrocarbon polymer modifier being present from 5 to 50 phr.

The hydrocarbon polymer modifier in embodiments is preferably made from a monomer mixture comprising from 1 to 60% piperylene components, from 5 to 50% cyclic components, and from 1 to 60% aromatic, preferably styrenic components. Alternatively or additionally, in an embodiment, the hydrocarbon polymer modifier comprises an interpolymer of from 10 to 80 wt % units derived from at least one piperylene component, from 15 to 50 wt % units derived from at least one cyclic pentadiene component, and from 10 to 30 wt % units derived from at least one styrenic component. The monomer mixture or the interpolymer may optionally comprise up to 5% isoprene, up to 10% amylene components, up to 5% indenic components, or any combination thereof.

In one embodiment, there is only one interpolymer in the hydrocarbon polymer modifier. In another embodiment, two or more interpolymers may be blended. When two or more interpolymers are used, either at least one of the interpolymers, or the resulting blended hydrocarbon polymer modifier, preferably both, may preferably comprise from 10 to 80 wt % units derived from at least one piperylene component, from 15 to 50 wt % units derived from at least one cyclic pentadiene component, and from 10 to 30 wt % units derived from at least one aromatic, preferably styrenic components. The hydrocarbon polymer modifier blend may optionally comprise up to 5% isoprene, up to 10% amylene, and up to 5% indenic components. Preferably, the elastomeric composition comprises from 5 to 50 phr of hydrocarbon polymer modifier or hydrocarbon polymer modifier blend.

In one embodiment, the elastomeric composition is used in a tire, such as in the tread, or other tire component. In tire construction and model tread formulations, the elastomeric composition may comprise: 100 phr of elastomer(s); from 50 to 90 phr of fillers such as, for example, carbon black and/or silica; from 5 to 50 phr of hydrocarbon polymer modifier(s); optionally, about 0.5 to 3 phr of ZnO; optionally, about 1 phr of stearic acid; optionally, about 1 to 4 phr of accelerators; optionally, about 1 to 2 phr of sulfur; optionally, up to about 5 phr of other processing aids; and optionally, depending on the application, about 0.5 to 4 phr of antidegradants.

In some embodiments, the hydrocarbon polymer modifier(s) can be used in addition to other processing aids and oils, or as a replacement for other processing aids and oils. Preferably, the elastomeric compositions are substantially free of aromatic oils. Substantially free of aromatic oils is defined to mean that the elastomeric composition comprises less than 0.5 phr of aromatic oil, or more preferably less than 0.25 phr of aromatic oil, or most preferably less than 0.1 phr of aromatic oil. Aromatic oils are compounds containing at least 35% by mass of single- and multiple-ring compounds. Generally, aromatic oils contain aromatically unsaturated polycyclic components.

In some embodiments, replacing aromatic oil with hydrocarbon polymer modifier(s) can improve compound tack, adhesion, and tear strength; improve aged tensile strength retention; improve abrasion resistance and storage modulus, G'; provide an increase in tan delta at 0° C., which can be used as a predictor for wet tire traction; provide an increase in tan delta within the range of from 30° C. to 70° C., which can be used as an indicator of dry traction, rolling resistance and other enhanced performance characteristics under normal use conditions; or provide an increase in tan delta above 70° C., which can be used as an indicator of tire grip and other enhanced performance characteristics under extreme use conditions; or any combination of any two or more or all of these improvements.

In some embodiments, the hydrocarbon polymer modifiers can be miscible or immiscible in the elastomer. Immiscibility can result, for example, where the solubility parameters of the elastomer and the HPM are sufficiently different, i.e., the HPM is incompatible with the elastomer. In another embodiment, the HPM can have a sufficiently high molecular weight to confer immiscibility in an elastomeric matrix, even where the HPM would be compatible with the elastomer mix due to similar solubility parameters and otherwise miscible if the molecular weight were lower.

In some embodiments, the HPM is co-curable or co-cured with the elastomer. The HPM in one embodiment comprises olefinic unsaturation or other functionality that facilitates participation in the crosslinking or vulcanization of the rubber mixture. In one embodiment, the HPM is co-curable or co-cured with filler in the elastomeric composition, for example, with silica filler. Co-curing the HPM, which can be either miscible or immiscible in the elastomer, can inhibit migration of the HPM to a surface of the cured rubber article, thus allowing the rubber composition to retain its desired properties for a longer period of time up to the useful lifetime of the article.

Elastomer

The elastomeric composition comprises at least one elastomer. Typical elastomers that may be included in the elastomeric compositions include butyl rubber, branched ("star-branched") butyl rubber, star-branched polyisobutylene rubber, random copolymers of isobutylene and para-methylstyrene (poly(isobutylene-co-p-methylstyrene)), polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber ("SBR"), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, and any halogenated versions of these elastomers and mixtures thereof. Useful elastomers can be made by any suitable means known in the art, and the invention is not herein limited by the method of producing the elastomer.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene.

In some embodiments, the elastomeric composition comprises a blend of two or more elastomers. Blends of elastomers may be reactor blends and/or melt mixes. The individual elastomer components may be present in various conventional amounts, with the total elastomer content in the elastomeric composition being expressed as 100 phr in the formulation.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ to $C_7$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers such as homopolymers and copolymers of olefins, isoolefins, and multiolefins. These and other types of useful butyl rubbers are well known and are described in RUBBER TECHNOLOGY, p. 209-581 (Morton, ed., Chapman & Hall 1995), THE VANDERBILT RUBBER HANDBOOK, p. 105-122 (Ohm ed., R.T. Vanderbilt Col., Inc. 1990), and Kresge and Wang in 8 KIRK-OTHMER ENCYCLOPEDIA OF CHEMICAL TECHNOLOGY, p. 9340955 (John Wiley & Sons, Inc. 4th ed. 1993), each of which are incorporated herein by reference. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

In an embodiment, the elastomer may be at least one non-isobutylene based rubber of types conventionally used in tire rubber compounding, and herein referred to as "general purpose rubber." A general purpose rubber may be any rubber that usually provides high strength and good abrasion along with low hysteresis and high resilience. These elastomers may require antidegradants in the mixed compound If they have poor resistance to both heat and ozone.

Examples of general purpose rubbers include natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof.

The elastomeric composition may also comprise rubbers of ethylene and propylene derived units, such as ethylene-propylene rubber ("EP") and ethylene-propylene-diene rubber ("EPDM"), and their mixtures. EP and EPDM are may also be considered to be general purpose elastomers. Examples of suitable termonomers in making EPDM are ethylidene norbornene, 1,4-hexadiene, dicyclopentadiene, as well as others.

In one embodiment, the elastomer may include a polybutadiene (BR) rubber. The Mooney viscosity of the polybutadiene rubber as measured at 100° C. (ML 1+4, ASTM D1646) may range from 35 to 70, or from 40 to about 65, or, in another embodiment, from 45 to 60.

Another useful synthetic rubber is high cis-polybutadiene ("cis-BR"). By "cis-polybutadiene" or "high cis-polybutadiene", it is meant that 1,4-cis polybutadiene is used, wherein the amount of the cis component is at least 95%.

The elastomeric composition may also comprise a polyisoprene (IR) rubber. The Mooney viscosity of the polyisoprene rubber as measured at 100° C. (ML 1+4, ASTM D1646) may range from 35 to 70, or from 40 to about 65, or in another embodiment from 45 to 60.

In another embodiment, the elastomer may also comprise a natural rubber. Natural rubbers are described in detail by Subramaniam in RUBBER TECHNOLOGY, p 179-208 (Morton, ed., Chapman & Hall, 1995), herein incorporated by reference. Desirable embodiments of the natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) of from 30 to 120, or more preferably from 40 to 80.

In another embodiment, the elastomer may comprise a styrene rubber such as styrene butadiene rubber ("SBR") such as emulsion-SBR ("E-SBR"), solution SBR (S-SBR), high styrene rubber ("HSR") and the like. Desirable embodiments of the SBRs may have a styrene content from 10 to 60 wt %, such as E-SBR elastomers available from JSR Corporation, which include JSR 1500 (25 wt % styrene), JSR 1502 (25 wt % styrene), JSR 1503 (25 wt % styrene), JSR 1507 (25 wt % styrene), JSR 0202 (45 wt % styrene), JSR SL552 (25 wt % styrene), JSR SL574 (15 wt % styrene), JSR SL563 (20 wt % styrene), JSR 0051, JSR 0061, or the like. Preferred SBRs have a Mooney viscosity at 100° C. (ML 1+4, ASTM D1646) of from 30 to 120, or more preferably from 40 to 80.

The elastomers useful in the invention can be blended with various other rubbers or plastics, in particular thermoplastic resins, such as nylons or polyolefins, such as polypropylene or copolymers of polypropylene. These compositions are useful in air barriers, such as bladders, tire inner tubes, tire innerliners, air sleeves (such as in air shocks), diaphragms, as well as other applications where high air or oxygen retention is desirable.

Hydrocarbon Polymer Modifiers ("HPM")

The elastomeric composition further comprises a hydrocarbon polymer modifier ("HPM"). HPMs useful in this invention include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the HPM is hydrogenated. In other embodiments, the HPM is non-polar. As used herein, non-polar means that the HPM is substantially free of monomers having polar groups.

As used herein, reference to monomers in the HPM interpolymer is understood to refer to the as-polymerized units derived from that monomer. The terms polymer and interpolymer are used broadly herein and in the claims to encompass higher oligomers having a number average molecular weight (Mn) equal to or greater than 500, as well as compounds that meet the molecular weight limits for polymers according to classic ASTM definitions.

HPMs can be used as elastomer compounding materials. Depending on how the HPM is compounded, optimization of rubber characteristics for rubber and tire durability, traction, and abrasion resistance can be achieved. The macrostructure (molecular weight, molecular weight distribution, and branching) of the HPM provides unique properties to the polymer additive.

Suitable HPMs may include both aromatic and nonaromatic components. Differences in the HPMs are largely due to the olefins in the feedstock from which the hydrocarbon components are derived. The HPM may contain "aliphatic" hydrocarbon components which have a hydrocarbon chain formed from $C_4$-$C_6$ fractions containing variable quantities of piperylene, isoprene, mono-olefins, and non-polymerizable paraffinic compounds. Such HPMs are based on pentene, butane, isoprene, piperylene, and contain reduced quantities of cyclopentadiene or dicyclopentadiene.

The HPM may also contain "aromatic" hydrocarbon structures having polymeric chains which are formed of aromatic units, such as styrene, xylene, $\alpha$-methylstyrene, vinyl toluene, and indene. In one embodiment, the HPM may contain an aromatic content to match the aromatic content of the elastomer component(s), e.g., a high aromatic content in styrene rubbers, or a low aromatic content in natural rubbers, for compatibility or miscibility. Compatibility is desired, for example, where the HPM is used to change or shift the Tg of the elastomer domain, where improved dispersion of the HPM is desired, and/or where compatibility facilitates inhibition of HPM migration in the elastomeric composition. Compatibility may also be desired where the HPM or HPM derivative is otherwise immiscible with the elastomer component(s) for another reason, such as, for example, a high molecular weight HPM, or the presence of HPM-derived units such as an HPM-filler-co-graft which limits the mobility of the bound HPM and/or facilitates dispersion of the grafted filler particles.

In another embodiment, the HPM may contain an aromatic content to impart incompatibility or immiscibility with the elastomer component(s), e.g., a low aromatic content in styrene rubbers, or a high aromatic content in natural rubbers. Incompatibility may be beneficial where, for example, the HPM is not required or desired to shift or change the Tg of the elastomer phase, especially where the mobility of the HPM may be inhibited by high molecular weight, co-curing with the elastomer component(s), co-curing with the filler(s), or any combination thereof.

In accordance with the present invention, the HPM used in rubber compounding includes olefins, such as piperylene, isoprene, amylenes, and cyclic components. The HPM may also contain aromatic olefins, such as styrenic components and indenic components.

Piperylene components are generally a distillate cut or synthetic mixture of $C_5$ diolefins, which include, but are not limited to, cis-1,3-pentadiene, trans-1,3-pentadiene, and mixed 1,3-pentadiene. For example, the piperylene component in one embodiment can include trans-pentadiene-1,3, cyclopentene, cis-pentadiene and mixtures thereof. In general, piperylene components do not include branched $C_5$ diolefins, such as isoprene. In one embodiment, the HPM is prepared from a monomer mix having from 0.1 to 90% piperylene components, or with a range of piperylene components from any lower limit selected from 0.1, 1, 10, 20, 25, 30, 35, 40, 45, or 50% piperylene components up to any higher upper limit selected from 80, 75, 70, 65, 60, 55, 50, 45, 40 or 35% piperylene components, by weight of the total monomers in the monomer mixture. In a particularly preferred embodiment, the HPM is prepared from a monomer mix comprising from 40 to 80% piperylene components, or from 40 to 65% piperylene components, or from 40 to 50% piperylene components.

In one embodiment, the HPM is substantially free of isoprene. In another embodiment, the HPM is prepared from a monomer mix that contains up to 15% isoprene, or less than 10% isoprene, by weight of the monomers in the mix. In yet another embodiment, the monomer mix contains less than 5% isoprene by weight of the monomers in the mix.

In general, the amylene component acts as a chain transfer agent to inhibit molecular weight growth. In an embodiment, the amylene component is selected from the group consisting of 2-methylbutene-1, 2-methylbutene-2, pentene-1, cis-pentene-2, trans-pentene-2 and mixtures thereof. In one embodiment, the HPM is substantially free of amylene derived units. In another embodiment, the HPM monomer mix contains up to 40% amylene, or less than 30% amylene, or less than 25% amylene, or less than 20% amylene, or less than 15% amylene, or less than 10% amylene, or less than 5% amylene, by weight of the monomers in the monomer mix. In yet another embodiment, the HPM is prepared from a monomer mix of from 0.1 up to 10% amylene, by weight of the monomers in the mixture.

Cyclic components are generally a distillate cut or synthetic mixture of $C_5$ and $C_6$ cyclic olefins, diolefins, and dimers, codimers and trimers, etc. from a distillate cut. Cyclics include, but are not limited to, cyclopentene, cyclopentadiene, dicyclopentadiene, cyclohexene, 1,3-cyclohexadiene, and 1,4-cyclohexadiene. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups. In one embodiment, the cyclic components are selected from the group consisting of: cyclopentadiene, cyclopentadiene dimer, cyclopentadiene trimer, cyclopentadiene-$C_5$ codimer, cyclopentadiene-piperylene codimer, cyclopentadiene-$C_4$ codimer, cyclopentadiene-methyl cyclopentadiene codimer, methyl cyclopentadiene, methyl cyclopentadiene dimer, and mixtures thereof.

In general, the cyclic components increase the softening point. On the other hand, aromatics such as styrene tend to reduce the softening point, but the softening point decrease can be offset by increasing the relative proportion of cyclic component(s). In one embodiment, the HPM may be prepared from a monomer mix that can include up to 60% cyclics or up to 50% cyclics, by weight of the monomers in the mix. Typical lower limits include at least about 0.1% or at least about 0.5% or from about 1.0% cyclics in the monomer mix. In at least one embodiment, the HPM monomer mix may include more than 10% cyclic components up to 20% cyclics or more, or preferably up to 30% cyclics or more, or more preferably up to 40% cyclics or more, or more preferably up to 45% or 50% cyclics or more, by weight of the monomers in the monomer mixture from which the HPM is prepared. In a particularly preferred embodiment, the HPM monomer mixture comprises from about 10 to about 50% cyclics, or from about 20 to about 45% cyclics, or from about 20 to about 40% cyclic components.

Preferred aromatics that may be in the HPM include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. In general, styrenic components do not include fused-rings, such as indenics. Styrenic components include styrene, derivatives of styrene, and substituted sytrenes. In one embodiment, the aromatic component is a styrenic component that is selected from the group consisting of styrene, ortho-methyl-styrene, meta-methyl-styrene, para-methyl-styrene, α-methyl-styrene, t-beta-methyl-styrene, indene, methyl indene, vinyl toluene, and mixtures thereof. The aromatic or styrenic olefins in an embodiment are present in the HPM up to 60% styrenic components or up to 50%, typically from 5 to 45%, or more preferably from 5 to 30%. In particularly preferred embodiments, the HPM comprises from 10 to 25% aromatic or especially styrenic olefins.

The HPM may comprise less than 15% indenic components, or less than 10% indenic components. Indenic components include indene and derivatives of indene. In one embodiment, the HPM comprises less than 5% indenic components. In another embodiment, the HPM is substantially free of indenic components.

In one embodiment, the HPM can have a weight ratio of units derived from aromatic components to units derived from cyclic components, or preferably of styrenic components to cyclic components, of from 1:2 to 3:1, preferably from 1:2 to 2.5:1, or more preferably from 0.8:1 to 2.2:1, or from about 1:1 to about 2:1.

In another embodiment, the HPM can comprise from at least 1 mole percent aromatic hydrogen, based on the total moles of hydrogen in the interpolymer as determined by proton nuclear magnetic resonance (H-NMR). In another embodiment, the HPM comprises at least 5 mole percent aromatic hydrogen, e.g., from 5 to 30 mole percent aromatic hydrogen, or preferably from 5 to 25 mole percent aromatic hydrogen, or more preferably from 5 to 20 mole percent aromatic hydrogen, or more preferably from 8 to 15 mole percent aromatic hydrogen.

In another embodiment, the HPM comprises olefinic unsaturation, e.g., at least 1 mole percent olefinic hydrogen, based on the total moles of hydrogen in the interpolymer as determined by H-NMR. In another embodiment, the HPM comprises from 1 to 20 mole percent aromatic hydrogen, or preferably from 2 to 15 mole percent aromatic hydrogen, or more preferably from 2 to 10 mole percent aromatic hydrogen. Olefinic unsaturation is beneficial to facilitate crosslinking with the elastomer component(s), functionalization for co-curing with the filler, for example, or combinations thereof, or the like.

Generally HPMs have a number average molecular weight (Mn) greater than about 600 g/mole, or greater than about 800 g/mole, or greater than about 900, or greater than about 1000 g/mole. In an embodiment, the HPM has a Mn between about 900 g/mol and 3000 g/mole, or between about 1000 and 1500 g/mole. In at least one embodiment, HPMs have a weight average molecular weight (Mw) greater than about 2500 g/mole, or greater than about 5000 g/mole, or from about 2500 to about 25,000 g/mole, or from 3000 to 20,000 g/mole. Preferably, HPMs have a weight average molecular weight of from 3500 to 15,000 g/mole, or more preferably from about 5000 to about 10,000 g/mole. The HPM may have a z-average molecular weight (Mz) greater than about 10,000 g/mole, or greater than about 20,000 g/mole, or greater than about 30,000 g/mole. In embodiments, Mz ranges from 10,000 to 150,000 g/mole, or from 20,000 to 100,000 g/mole, or from 25,000 to 75,000 g/mole, or from 30,000 to 60,000 g/mole. Mw, Mn, and Mz may be determined by gel permeation chromatography (GPC).

In one embodiment, the HPM has a polydispersion index ("PDI", PDI=Mw/Mn) of 4 or less. In a particularly preferred embodiment, the HPM has a PDI of at least about 2.5, or at least about 3, or at least about 4, or at least about 5. In embodiments, Mz/Mn is greater than 5, greater than 10, greater than 12, greater than 15, greater than 20, greater than 25, or greater than 30. In embodiments, Mz/Mn ranges up to 150 or more, up to 100, up to 80, or up to 60. In other embodiments, Mz/Mn is from 5 to 100, or from 10 to 80, or from 10 to 60, or from 10 to 40, or from 10 to 30, or from 15 to 40, or from 30 to 60 or from 35 to 60.

In an embodiment, the HPM can have a softening point of 80° C. to 160° C., or preferably 100° C. to 160° C., or more preferably from 110° C. to 150° C. Softening point can be determined according to the Ring & Ball Method, as measured by ASTM E-28.

In an embodiment, the HPM can have a glass transition temperature (Tg) of from about 30° C. to about 110° C., or from about 50° C. to about 110° C., or from about 60° C. to about 100° C. Differential scanning calorimetry (DSC) may be used to determine the Tg of the HPM.

The resins described above may be produced by methods generally known in the art for the production of HPMs, and the invention is not limited by the method of forming the HPM. Preferably, the HPM is produced by combining the olefin feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In one embodiment, the HPM is not hydrogenated (to retain the olefin unsaturation). In another embodiment, the HPM may be partially hydrogenated. The hydrogenation of the HPM may be carried out by any method known in the art, and the invention is not limited by the method of hydrogenation. For example, the hydrogenation of the HPM may be either a batchwise or a continuous process, e.g., catalytically hydrogenated. Catalysts employed for the hydrogenation of HPMs are typically supported monometallic and bimetallic catalyst systems based on elements from Group 6, 8, 9, 10, or 11 of the Periodic Table of Elements.

Fillers and Additives

The elastomeric compositions produced in accordance with the present invention typically contain other components and additives customarily used in rubber compounds, such as effective amounts of other processing aids, pigments, accelerators, cross-linking and curing materials, antioxidants, antiozonants, fillers, and/or clays. In addition to HPM the elastomeric compositions may optionally include other useful processing aids such as, for example, plastomers, polybutene, or mixtures thereof.

In addition to comprising at least one elastomer and at least one hydrocarbon polymer modifier, the elastomeric compositions may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically range, for example, in the tire industry, from about 0.0001 μm to about 100 μm.

As used herein, silica is meant to refer to any type or particle size silica or another silicic acid derivative, or silicic acid, processed by solution, pyrogenic, or like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent such as organic molecules; the layered clay may comprise at least one silicate.

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which include saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminum oxides, hydrotalcite, and the like. Combinations of any of the above discussed silicates are also contemplated.

The layered filler, such as the layered clays described above may be modified, such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be added as an additive to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In one embodiment, one or more silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and the like, and mixtures thereof.

The filler may be carbon black or modified carbon black. The filler may also be a blend of carbon black and silica. In one embodiment, the elastomeric composition is a tire tread or sidewall and comprises reinforcing grade carbon black at a level of from 10 to 100 phr of the blend, more preferably from 30 to 80 phr in another embodiment, and in yet another embodiment from 50 to 80 phr. Useful grades of carbon black include the ranges of from N110 to N990.

Nanocomposites

Nanocomposites are filled polymer systems wherein the filler comprises inorganic particles with at least one dimension in the nanometer range. Common types of inorganic particle used in nanocomposites are phyllosilicates, an inorganic substance from the general class of so called "nanoclays" or "clays." Due to general enhancement in air barrier qualities of various elastomeric compositions when a nanocomposite is present, there is a desire to have an elastomeric composition comprising a nanocomposite comprising elastomer and clay. The hydrocarbon polymer modifiers in an embodiment can be used in nanocomposites to enhance gas barrier properties. For example, the HPM can improve dispersion of the nanoparticles in the elastomer, and the high molecular weight of the HPM can help increase the length of the diffusion path of the gas molecules, etc.

The inorganic particles (e.g., clays) can act as plate-like barriers to the transmission of oxygen through the elastomeric composition. However, in order to be effective the inorganic particles need to be fully dispersed throughout the elastomeric composition. This can be difficult, as it generally requires the dispersion of polar clay in a generally non-polar rubber. Ideally, intercalation should take place in the nanocomposite, wherein the polymer inserts into the space or gallery between the clay surfaces. Ultimately, it is desirable to have near complete exfoliation, wherein the polymer is fully dispersed or intercalated with the individual nanometer-size clay platelets.

Suitable inorganic particles useful in nanocomposites can include swellable inorganic clay materials, such as natural or synthetic phyllosilicates, particularly smectic clays, such as montmorillonite, nontronite, beidellite, volkonskoite, laponite, hectorite, saponite, sauconite, magadite, kenyaite, stevensite and the like, as well as vermiculite, halloysite, aluminum oxides, hydrotalcite, and the like. These layered clays generally comprise particles containing a plurality of silicate platelets having a thickness of 0.8-1.2 nm tightly bound together at an interlayer spacing of 0.4 nm or less, and contain exchangeable cations, such as $Na^+$, $Ca^{+2}$, $K^+$, or $Mg^{+2}$ present at the interlayer surfaces.

In some embodiments, the clay can be mixed with an organic liquid to form a clay dispersion. The clay can be inorganic clay or an organically modified clay; the organic liquid can be miscible or immiscible in water. In certain embodiments, the dispersion can have a clay concentration in the range of 0.1 to 5.0 wt %, or in the range of 0.1 to 3.0 wt %.

The layered clay may also be intercalated and exfoliated by treatment with organic molecules, typically known as swelling or exfoliating agents or additives. The swelling/exfoliating agents are capable of undergoing ion exchange reactions with the cations present at the interlayer surfaces of the layered clay. For example, an intercalated/exfoliated clay may be produced through solution based ion-exchange reactions that replace sodium ions that exist on the surface of the sodium montmorillonite clay with organic molecules (swelling/exfoliating agents), such as alkyl or aryl ammonium compounds.

Suitable exfoliating agents include cationic surfactants, such as ammonium ion, alkylamines or alkylammonium ion (primary, secondary, tertiary and quaternary), phosphonium or sulfonium derivatives of aliphatic, aromatic or arylaliphatic amines, phosphines, and sulfides. Desirable amine compounds (or the corresponding ammonium ion) are those with the structure $R_1R_2R_3N$, wherein $R_1$, $R_2$, and $R_3$ are $C_1$ to $C_{30}$ alkyls in one embodiment or $C_2$ to $C_{30}$ alkyls or alkenes in another embodiment, which may be the same or different. In one embodiment, the exfoliating agent is a so called long chain tertiary amine, wherein at least $R_1$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R_4R_5N$—$R_6$—$NR_7R_8$, wherein $R_4$, $R_5$, $R_6$, $R_7$, and $R_8$ are the same or different $C_1$ to $C_{30}$ alkyls, or $C_2$ to $C_{30}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, and N,N,N'-trimethyl-N'-tallow-1,3-diaminopropane.

Another class of exfoliating agents includes those which can be covalently bonded to the interlayer surfaces. These include polysilanes of the structure —$Si(R_{15})_2R_{16}$ where $R_{15}$ is the same or different at each occurrence and is selected from alkyl, alkoxy or oxysilane and $R_{16}$ is an organic radical compatible with the matrix polymer of the composite. Other suitable exfoliating agents include protonated amino acids and salts thereof containing 2-30 carbon atoms, such as 12-aminododecanoic acid, epsilon-caprolactam, and like materials. Suitable swelling agents and processes for intercalating layered clay silicates are also disclosed in U.S. Pat. Nos. 4,472,538, 4,810,734, and 4,889,885, all of which are incorporated herein by reference.

In a preferred embodiment, the exfoliating agent(s) are capable of reaction with functional sites, such as silyl groups, halogens, olefinic unsaturation or the like, on the interpolymer and/or elastomer to form complexes which help exfoliate the clay. In one embodiment, the agent includes all primary, secondary, and tertiary amines and phosphines; alkyl and aryl sulfides and thiols; and their polyfunctional versions. Desirable agents include: long-chain tertiary amines, such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In one embodiment, the exfoliating agent may be present in the range of 0.1 to 20 phr or in the range of 0.2 to 15 phr, or in the range of 0.3 to 10 phr in another embodiment. The exfoliating agent may be added to the composition at any stage; for example, the agent may be added to the elastomer and/or interpolymer, followed by addition of the clay, or may be added to the elastomer and/or interpolymer and clay mixture; or the additive may be first blended with the clay, followed by blending with the elastomer and/or interpolymer in yet another embodiment.

In another embodiment, improved impermeability is achieved by the presence of at least one polyfunctional curative. An embodiment of such polyfunctional curatives can be described by the formula Z—$R_{17}$—Z', wherein $R_{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer (elastomer and/or interpolymer) having reactive groups such as unsaturation. The polyfunctional curative, if present, may be present in the composition in the range of 0.1 to 8 phr or in the range of 0.2 to 5 phr in another embodiment.

The elastomeric composition may also include reversion resistors. Non-limiting examples of such reversion resistors include bis-thiosulfate compounds, such as hexamethylene bis(sodium thiosulfate). Other reversion resistors are well known in the rubber compounding arts, such as hexamethylene bis(cinnamaldehyde).

Treatment with the swelling agents results in intercalation or "exfoliation" of the layered clay platelets as a consequence of a reduction of the ionic forces holding the layers of clay platelets together and introduction of molecules between layers which serve to space the layers at distances of greater than 0.4 nm, preferably greater than 0.9 nm. This separation allows the layered clay silicate to more readily absorb polymerizable monomer material and polymeric material between the layers and facilitates further delamination of the layers when the intercalate is shear mixed with matrix polymer material to provide a uniform dispersion of the exfoliated clay layers within the polymer matrix.

The amount of clay or exfoliated clay incorporated in the elastomeric composition is sufficient to develop an improvement in the mechanical properties or barrier properties of the composition by the formation of a nanocomposite. Amounts of clay in the elastomeric composition generally will be in the range of 0.5 wt % to 10 wt %, or in the range of 1 wt % to 8 wt %, or in the range of 1 wt % to 5 wt % in another embodiment, based on the polymer content of the composition. Expressed in parts per hundred parts of rubber, the clay or exfoliated clay may be present in the range of 1 phr to 30 phr or in the range of 2 phr to 20 phr.

Elastomer-clay nanocomposites can be formed using a variety of processes known in the art, such as solution blending, melt blending, or an emulsion process. For example, U.S. Patent Application Publication 2007/015853, incorporated herein by reference, discloses a method for preparing clay-butyl rubber nanocomposites from an emulsion of rubber solution and aqueous clay dispersion in which the clay can be an inorganic clay. As another example of nanocomposite processing, U.S. Pat. No. 7,501,460, incorporated herein by reference, discloses a method for preparing clay-butyl rubber nanocomposites by preparing a concentrated nanocomposite from a slipstream of the rubber and blending the concentrate with a main rubber stream.

In one embodiment, the elastomeric composition may contain a nanocomposite formed by a polymer melt blending process. For example, the elastomer and clay components may be blended to form an intercalate in any suitable mixing device, such as a BANBURY mixer, BRABENDER mixer, or preferably a mixer/extruder and mixing at temperatures in the range of 120° C. up to 300° C., under conditions of shear sufficient to allow the clay to intercalate and to exfoliate and become uniformly dispersed within the polymer to form the nanocomposite.

In another embodiment, a nanocomposite may be formed by an emulsion process. For example, the emulsions may be formed by conventional emulsion technology, that is, subjecting a mixture of the hydrocarbon, water, and surfactant, when used, to sufficient shearing, as in a commercial blender or its equivalent for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the clay, for example, from 0.1 to 100 hours or more in one embodiment, or from 1 to 50 hours, or from 2 to 20 hours in another embodiment.

Useful cationic surfactants include tertiary amines, diamines, polyamines, amine salts, as well as quaternary ammonium compounds. Useful non-ionic surfactants include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates. The surfactant concentration is generally that which will allow the formation of a relatively stable emulsion; in preferred embodiments, the amount of surfactant employed is at least 0.001 wt % of the total emulsion, more preferably in the range of 0.001 to about 3 wt %, and most preferably in the range of 0.01 to 2 wt %.

In other embodiments, the nanocomposite may be formed by solution blending. For example, the nanocomposite may be produced by contacting Solution A comprising a solvent comprising a hydrocarbon and at least one layered filler or clay with Solution B comprising a solvent and at least one elastomer, and removing the solvents from the contact product of Solution A and Solution B to form a nanocomposite. The layered clay may be treated with a swelling/exfoliating agent. In yet another embodiment, a nanocomposite is produced by a process comprising contacting at least one elastomer and at least one layered filler in at least one or more solvents; and removing the solvent(s) from the product to form a nanocomposite. In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In solution blending processes, the solvents may be present in the range of 30 to 99 wt %, alternatively 40 to 99 wt %, alternatively 60 to 99 wt %, alternatively 80 to 99 wt %, alternatively in the range of 90 to 99 wt %, alternatively from 95 to 99 wt %, based upon the total weight of the composition.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the mechanical properties of the polymer. Physical properties, performance characteristics, and durability of vulcanized rubber compounds are known to be related to the number (crosslink density) and type of crosslinks formed during the vulcanization reaction. Polymer blends may be crosslinked by adding curative agents, for example, sulfur, metals, metal oxides, such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from 150° C. to 200° C. in another embodiment, for about 1 to 150 minutes.

Halogen-containing elastomers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives, such as sulfur or a sulfur compound, an alkylperoxide compound, diamines, or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-t-butyl-2-benzothiazole sulfenamide (TBBS), N-cyclohexyl-2-benzothiazole-sulfenamide (CBS), and thioureas.

In one embodiment of the invention, at least one curing agent(s) is present from 0.2 to 10 phr, or from 0.5 to 5 phr, or in another embodiment from 0.75 phr to 2 phr.

Processing

The inventive elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In a further embodiment, mixing with the clays is performed by techniques known to those skilled in the art, wherein the clay is added to the polymer at the same time as the carbon black. In other embodiments, additional stages may involve incremental additions of one or more fillers.

In another embodiment, mixing of the components may be carried out by combining the elastomer components, filler and clay in any suitable mixing device, such as a two-roll open mill, BRABENDER™ internal mixer, BANBURY™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow the clay to exfoliate and become uniformly dispersed within the elastomer(s).

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, are typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

INDUSTRIAL APPLICABILITY

The elastomeric compositions of the invention may be extruded, compression molded, blow molded, injection molded, and laminated into various shaped articles including fibers, films, laminates, layers, industrial parts, such as automotive parts, appliance housings, consumer products, packaging, and the like.

In particular, the elastomeric compositions are useful in articles for a variety of tire applications, such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as an innerliner for a tire. The article may be selected from air barriers, air membranes, films, layers (microlayers and/or multilayers), innerliners, inner tubes, air sleeves, sidewalls, treads, tire curing bladders, and the like. The elastomeric composition may be particularly useful in a tire tread.

The elastomeric compositions of the present invention are useful in a variety of applications, particularly pneumatic tire components, hoses, belts, such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

Accordingly, the invention provides the following embodiments:

A. An elastomeric composition comprising at least one elastomer and at least one hydrocarbon polymer modifier wherein the hydrocarbon polymer modifier comprises an interpolymer of (i) at least one piperylene component; (ii) at least one cyclic pentadiene component; and (iii) at least one aromatic component, wherein the interpolymer has (a) a softening point from 80° C. to 160° C.; (b) z-average molecular weight greater than 10,000; (c) at least 1 mole percent olefinic hydrogen, based on the total moles of hydrogen in the interpolymer; and (d) at least 1 mole percent aromatic hydrogen, based on the total moles of hydrogen in the interpolymer.

B. The elastomeric composition of embodiment A, wherein the interpolymer comprises a softening point from 110° C. to 150° C., number average molecular weight greater than 800, weight average molecular weight greater than 2500, z average molecular weight greater than 20,000 and at least 5 mole percent aromatic hydrogen.

C. The elastomeric composition of embodiment A or embodiment B, wherein the olefinic hydrogen content of the interpolymer is at least 1 mole percent olefinic hydrogen, based on the total moles of hydrogen in the interpolymer.

D. The elastomeric composition of embodiment A to embodiment C, wherein the olefinic hydrogen content of the interpolymer is from 2 to 10 mole percent at least 1 mole percent olefinic hydrogen, based on the total moles of hydrogen in the interpolymer.

E. The elastomeric composition of any one of embodiment A to embodiment D, wherein the interpolymer is obtained by carbocationic interpolymerization from a monomer mixture comprising from 1 wt % to 60 wt % of the piperylene component, from 5 wt % to 50 wt % of the cyclic pentadiene component, and from 1 wt % to 60 wt % of the aromatic component, by total weight of monomers in the monomer mixture.

F. The elastomeric composition of any one of embodiment A to embodiment E, wherein the interpolymer comprises from 10 wt % to 80 wt % units derived from the at least one piperylene component, from 15 wt % to 50 wt % units derived from the at least one cyclic pentadiene component, and from 10 wt % to 30 wt % units derived from the at least one aromatic component, by total weight of the interpolymer.

G. The elastomeric composition of any one of embodiment A to embodiment F, wherein the piperylene component is selected from the group consisting of: trans-pentadiene-1,3, cyclopentene, cis-pentadiene and mixtures thereof; the cyclic pentadiene component is selected from the group consisting of: cyclopentadiene, cyclopentadiene dimer, cyclopentadiene trimer, cyclopentadiene-$C_5$ codimer, cyclopentadiene-piperylene codimer, cyclopentadiene-$C_4$ codimer, cyclopentadiene-methyl cyclopentadiene codimer, methyl cyclopentadiene, methyl cyclopentadiene dimer, and mixtures thereof; and wherein the aromatic component is selected from the group consisting of: styrene, ortho-methyl-styrene, meta-methyl-styrene, para-methyl-styrene, α-methyl-styrene, t-beta-methyl-styrene, indene, methyl indene, vinyl toluene and mixtures thereof.

H. The elastomeric composition of any one of embodiment A to embodiment G, wherein the at least one cyclic pentadiene component includes at least 10 mole percent of dimers, trimers, codimers and cotrimers, by total moles of the cyclic pentadiene component in the monomer mixture.

I. The elastomeric composition of embodiment E, wherein the at least one cyclic pentadiene component in the monomer mixture includes at least 10 mole percent of dimers, trimers, codimers and cotrimers, by total moles of the cyclic pentadiene component in the monomer mixture.

J. The elastomeric composition of any one of embodiment A to embodiment I, wherein the interpolymer further comprises at least one amylene component.

K. The elastomeric composition of embodiment J, wherein the at least one amylene component is selected from the group consisting of 2-methylbutene-1,2-methylbutene-2, pentene-1, cis-pentene-2, trans-pentene-2 and mixtures thereof.

L. The elastomeric composition of any one of embodiment A to embodiment K, wherein the interpolymer is co-cured with the at least one elastomer.

M. The elastomeric composition of any one of embodiments A to embodiment L, further comprising a filler, wherein the interpolymer is co-curable with the filler.

N. The elastomeric composition of any one of embodiment A to embodiment M, wherein the interpolymer is immiscible with the at least one elastomer.

O. The elastomeric composition of any one of embodiment A to embodiment N, wherein the hydrocarbon polymer modifier is present at from 5 phr to 50 phr.

P. A tire or tire component comprising the elastomeric composition of any one of embodiment A to embodiment O.

Q. A method, comprising: melt processing an elastomeric mixture to form a green elastomeric composition in the shape of an article, wherein the elastomeric mixture comprises the elastomeric composition of any one of embodiment A to embodiment N and a cure package; and curing the green elastomeric composition to form the article.

R. The method of embodiment Q, wherein the modifier is present in the elastomeric mixture in an amount effective to lower the Mooney viscosity.

S. The method of embodiment Q or embodiment R, further comprising adhering a build component to a surface of the green elastomeric composition and co-curing the build component with the article to form a construct.

T. The method of embodiment S, wherein the construct comprises a tire and the article comprises a tire tread, a tire innerliner or a tire carcass.

U. The method of any one of embodiment Q to embodiment T, wherein the green elastomeric composition has a tack to the build component of at least 5N.

V. The article obtained by the method of any one of embodiment A to embodiment U.

W. An elastomeric composition comprising at least one elastomer and at least one hydrocarbon polymer modifier comprising an interpolymer of (i) from 10 to 80 wt % units derived from at least one piperylene component; (ii) from 15 to 50 wt % units derived from at least one cyclic pentadiene component; and (iii) from 10 to 30 wt % units derived from at least one styrenic component, wherein the interpolymer has (a) a softening point from 80° C. to 160° C.; (b) z-average molecular weight greater than 10,000; (c) at least 1 mole percent olefinic hydrogen, based on the total moles of hydrogen in the interpolymer; and (d) at least 5 mole percent aromatic hydrogen, based on the total moles of hydrogen in the interpolymer.

X. An elastomeric composition comprising at least one elastomer and at least one hydrocarbon polymer modifier comprising an interpolymer of (i) at least one piperylene component; (ii) at least one cyclic pentadiene component; and (iii) at least one styrenic component, wherein the interpolymer has (a) a softening point from 80° C. to 160° C.; (b) z-average molecular weight greater than 20,000; (c) at least 1 mole percent olefinic hydrogen, based on the total moles of hydrogen in the interpolymer; and (d) at least 5 mole percent aromatic hydrogen, based on the total moles of hydrogen in the interpolymer.

EXAMPLES

The elastomeric compositions comprising at least one elastomer and hydrocarbon polymer modifiers will now be further described with reference to the following non-limiting examples.

Aromatic, olefinic and aliphatic hydrogen content of the hydrocarbon polymer modifiers were determined by proton nuclear magnetic resonance ("H-NMR").

Cure properties were measured using an MDR 2000 from Alpha Technologies, Inc. at the indicated temperature and 0.5 degree arc, based on ASTM D-2084. Test specimens were cured at the indicated temperature, typically from 150° C. to 160° C., for a time (in minutes) corresponding to t90+appropriate mold lag. When possible, standard ASTM tests were used to determine the cured compound physical properties.

The values "MH" and "ML" used herein refer to "maximum torque" and "minimum torque," respectively.

Other test methods are listed in Table 1.

TABLE 1

| Test Methods | | |
| --- | --- | --- |
| Parameter | Units | Test |
| Moving Die Rheometer (MDR) @ 160° C., ±0.5° arc | | |
| ML | dNm | ASTM D5289 |
| MH | dNm | |
| Delta Torque | dNm | MH-ML |
| ts2 | minutes | |
| t50 | minutes | |
| t90 | minutes | |

The hydrocarbon polymer modifiers used in the examples are complex copolymers where the copolymer properties can be controlled by the type and amount of monomers included, i.e., the microstructure of the copolymer. Monomer placement in the polymer chain is random leading to further complexity in the polymer microstructure. Table 2 lists typical ranges for the type and amounts of monomers which define the hydrocarbon polymer modifiers used in the examples. The structures shown in Table 2 are representative only, and are not limiting. Typical feed stream compositions, yields, physical and chemical properties of hydrocarbon polymer modifiers used in the examples are listed in Table 3.

TABLE 2

| Monomer Type | HPM Feed Range | Representative Structure(s) |
| --- | --- | --- |
| Piperylene | 35-58 | |
| Isoprene | 0-5 | |
| Amylenes | 0-10 | |
| Cyclics | 9-30 | |
| Styrene | 14-15 | |
| Indene | 0-5 | |

TABLE 3

| | HPM1 | HPM2 | HPM3 | HPM4 | HPM5 | HPM6 | HPM7 |
| --- | --- | --- | --- | --- | --- | --- | --- |
| Feed Composition (wt %) | | | | | | | |
| Piperylenes | 55 | 58 | 46 | 49 | 38 | 38 | 35 |
| Styrene | 15 | 15 | 15 | 15 | 0 | 14 | 14 |
| α-Methyl Styrene | 0 | 0 | 0 | 0 | 14 | 0 | 0 |
| Cyclics | 9 | 9 | 18 | 18 | 30 | 30 | 30 |
| Isoamylene | 3 | 0 | 3 | 0 | 0 | 0 | 3 |
| Raffinate | 18 | 18 | 18 | 18 | 18 | 18 | 18 |
| Total | 100 | 100 | 100 | 100 | 100 | 100 | 100 |
| Yield (wt %) | | | | | | | |
| HPM | 43.3 | 43.8 | 41.6 | 42.4 | 42.2 | 43.1 | 43.1 |
| Softening Point (° C.) | | | | | | | |
| HPM | 88.9 | 94.4 | 96.6 | 105.2 | 114.0 | 123.8 | 116.4 |
| GPC (kg/mole) | | | | | | | |
| Mn | 0.945 | 1.08 | 0.991 | 1.14 | 1.16 | 1.29 | 1.07 |
| Mw | 2.56 | 3.77 | 3.31 | 5.91 | 5.17 | 9.39 | 5.42 |

TABLE 3-continued

|       | HPM1 | HPM2 | HPM3 | HPM4 | HPM5 | HPM6 | HPM7 |
|---|---|---|---|---|---|---|---|
| Mz    | 14.0 | 20.4 | 16.6 | 36.8 | 30.1 | 56.2 | 34.0 |
| Mw/Mn | 2.71 | 3.48 | 3.34 | 5.20 | 4.48 | 7.27 | 5.06 |
| H-NMR (mole %) | | | | | | | |
| Aromatic H  | 11.5 | 12.1 | 12.1 | 12.3 | 11.9 | 12.0 | 11.9 |
| Olefinic H  | 4.3  | 4.8  | 5.0  | 5.4  | 6.1  | 6.0  | 5.5  |
| Aliphatic H | 84.2 | 83.1 | 82.9 | 82.3 | 82.0 | 82.0 | 82.6 |

A listing of various components used in the elastomeric compositions of the examples is in Table 4.

TABLE 4

Other Components in the Elastomeric Compositions

| Material | Brief Description | Source | Commercial Name |
|---|---|---|---|
| Natural Rubber | Elastomer | Various sources | TSR 20 |
| HS-SBR | Emulsion SBR 40% Styrene | JSR Corporation | JSR 0202 |
| Aromatic Oil | Process Oil | Sunoco | Sundex 8125 |
| Naphthenic Oil | Process oil | Calument | Calsol 8240 |
| R2336 | Commercial Resin, 52.2% aromatic, Mw 1 k, Mz 1.5 k | Hercules, Inc. | Kristalex Res R2336 |
| 373N | Commercial Resin, 12% aromatic, Mw 1.6 k, Mz 4 k | ExxonMobil Chemical Company | OPPERA™ PR373 |
| ZnO | Zinc oxide, curative | Zinc Corp of America | KADOX 911 |
| 6PPD | Antiozonant, 1,3-dimethylbutyl-N'- phenyl-p-phenylene diamine | Flexsys | Santoflex 6PPD |
| CBS | Accelerator; N-cyclohexyl-2-benzothiazole-sulfenamide | Flexsys | Santocure CBS |
| DPG | Accelerator, diphenyl guanidine | Flexsys | Perkacit DPG |
| Sulfur | Crosslinking agent | RE Carroll | Rubbermakers Sulfur |

Example 1

The ability of the hydrocarbon polymer modifiers to cure into the rubber matrix was investigated by comparing extractables and delta torque measurements for cured rubber formulations against control rubber formulations without processing aids and with other oils and resins as controls. Natural rubber was used. The rubber was compounded using a Brabender with cam blades. The non-productive mix cycle was as follows: 1) mixer rotor speed was set at 50 RPM, temperature set to 90° C.; 2) add elastomers, oils or hydrocarbon polymer modifiers, and free powders; and 3) mix for 8 minutes then remove the batch from the mixer, drop temperature varied from 95 to 105° C. The productive or second stage was added to the mixer with the vulcanization system ingredients. The rotor speed was 35 RPM with the temperature set at 90° C. The compound was mixed to for 4 minutes with a drop temperature around 95° C. The compound was cold pressed and then molded. The cured rubber compositions were then tested for extractables in cyclohexane for the natural rubber recipes, and in toluene for the SBR recipes, and MDR analyses run. The formulations and results based on the natural rubber are presented in Table 5.

TABLE 5

Natural Rubber Formulations and Properties
Rubber Formulation (weight %)

| Compound | NR1 | NR2 | NR3 | NR4 | NR5 | NR6 | NR7 | NR8 |
|---|---|---|---|---|---|---|---|---|
| Natural Rubber | 94.79 | 66.35 | 66.35 | 66.35 | 66.35 | 66.35 | 66.35 | 66.35 |
| Naphthenic oil | 0 | 28.44 | 0 | 0 | 0 | 0 | 0 | 0 |
| R2336 | 0 | 0 | 28.44 | 0 | 0 | 0 | 0 | 0 |
| 373N | 0 | 0 | 0 | 28.44 | 0 | 0 | 0 | 0 |
| HPM4 | 0 | 0 | 0 | 0 | 28.44 | 0 | 0 | 0 |
| HPM5 | 0 | 0 | 0 | 0 | 0 | 28.44 | 0 | 0 |
| HPM6 | 0 | 0 | 0 | 0 | 0 | 0 | 28.44 | 0 |
| HPM7 | 0 | 0 | 0 | 0 | 0 | 0 | 0 | 28.44 |
| ZnO | 0.47 | 0.47 | 0.47 | 0.47 | 0.47 | 0.47 | 0.47 | 0.47 |
| 6PPD | 0.95 | 0.95 | 0.95 | 0.95 | 0.95 | 0.95 | 0.95 | 0.95 |
| CBS | 1.52 | 1.52 | 1.52 | 1.52 | 1.52 | 1.52 | 1.52 | 1.52 |
| Sulfur | 1.33 | 1.33 | 1.33 | 1.33 | 1.33 | 1.33 | 1.33 | 1.33 |
| DPG | 0.95 | 0.95 | 0.95 | 0.95 | 0.95 | 0.95 | 0.95 | 0.95 |
| Cyclohexane Extraction (wt % extracted) | | | | | | | | |
| 2 Hours | 6.0 | 34.8 | 32.7 | 21.5 | 20.7 | 20.0 | 24.8 | ND |
| 4 Hours | 6.6 | 34.5 | 32.5 | 32.3 | 24.9 | 24.4 | 26.8 | ND |
| 6 Hours | 6.0 | 34.3 | 34.1 | 32.8 | 27.0 | 26.1 | 24.1 | ND |

TABLE 5-continued

Natural Rubber Formulations and Properties
Rubber Formulation (weight %)

| | Compound | | | | | | | |
|---|---|---|---|---|---|---|---|---|
| | NR1 | NR2 | NR3 | NR4 | NR5 | NR6 | NR7 | NR8 |
| MDR Delta Torque (dNm (in-lbs)) | | | | | | | | |
| MH-ML | 9.7 (8.6) | 6.56 (5.81) | 6.8 (6.02) | 6.25 (5.53) | 6.28 (5.56) | 5.89 (5.21) | 6.91 (6.12) | ND |

Note for Table 5:
ND = Not determined

As seen in the data presented in Table 5, the extractables were significantly lowered for the natural rubber formulations prepared using the inventive hydrocarbon polymer modifiers. The low delta torques were also consistent with crosslinking of the HPMs into the rubber matrix.

Example 2

The methodology of Example 1 was repeated using SBR JSR 0202. The formulations and results based on the SBR are presented in Table 6.

TABLE 6

SBR Formulations and Properties
Rubber Formulation (phr)

| | Compound | | | | | | | |
|---|---|---|---|---|---|---|---|---|
| | SBR1 | SBR2 | SBR3 | SBR4 | SBR5 | SBR6 | SBR7 | SBR8 |
| HS-SBR | 94.79 | 66.35 | 66.35 | 66.35 | 66.35 | 66.35 | 66.35 | 66.35 |
| Aromatic oil | 0 | 28.44 | 0 | 0 | 0 | 0 | 0 | 0 |
| R2336 | 0 | 0 | 28.44 | 0 | 0 | 0 | 0 | 0 |
| 373N | 0 | 0 | 0 | 28.44 | 0 | 0 | 0 | 0 |
| HPM4 | 0 | 0 | 0 | 0 | 28.44 | 0 | 0 | 0 |
| HPM5 | 0 | 0 | 0 | 0 | 0 | 28.44 | 0 | 0 |
| HPM6 | 0 | 0 | 0 | 0 | 0 | 0 | 28.44 | 0 |
| HPM7 | 0 | 0 | 0 | 0 | 0 | 0 | 0 | 28.44 |
| ZnO | 0.47 | 0.47 | 0.47 | 0.47 | 0.47 | 0.47 | 0.47 | 0.47 |
| 6PPD | 0.95 | 0.95 | 0.95 | 0.95 | 0.95 | 0.95 | 0.95 | 0.95 |
| CBS | 1.52 | 1.52 | 1.52 | 1.52 | 1.52 | 1.52 | 1.52 | 1.52 |
| Sulfur | 1.33 | 1.33 | 1.33 | 1.33 | 1.33 | 1.33 | 1.33 | 1.33 |
| DPG | 0.95 | 0.95 | 0.95 | 0.95 | 0.95 | 0.95 | 0.95 | 0.95 |
| Toluene Extraction (wt % extracted) | | | | | | | | |
| 2 Hours | 6.6 | 32.5 | 32.1 | 34.9 | 17.8 | 27.3 | 23.7 | 25.8 |
| 4 Hours | 7.4 | 36.4 | 36.4 | 36.1 | 28.9 | 29.0 | 26.7 | 29.3 |
| 6 Hours | 7.7 | 37.3 | 37.1 | 36.2 | 29.1 | 29.3 | 27.1 | 29.2 |
| MDR Delta Torque (dNm (in-lbs)) | | | | | | | | |
| MH-ML | 10.5 (9.32) | 9.63 (8.52) | 7.52 (6.66) | 6.7 (5.93) | 5.78 (5.12) | 5.45 (4.82) | 5.52 (4.89) | 5.27 (4.66) |

Lower extractables compared to the controls, as well as lower delta torque readings, indicated that the HPM materials were also crosslinked into the SBR rubber matrix.

The invention has been described above with reference to numerous embodiments and specific examples. Many variations will suggest themselves to those skilled in this art in light of the above detailed description. All such obvious variations are within the full intended scope of the appended claims.

We claim:

1. An elastomeric composition comprising at least one elastomer and at least one hydrocarbon polymer modifier wherein the hydrocarbon polymer modifier comprises an interpolymer of (i) at least one piperylene component; (ii) at least one cyclic pentadiene component; and (iii) at least one aromatic component, wherein the interpolymer has (a) a softening point from 80° C. to 160° C., (b) z-average molecular weight greater than 10,000, and (c) at least 1 mole percent aromatic hydrogen, based on the total moles of hydrogen in the interpolymer.

2. The elastomeric composition of claim 1, wherein the interpolymer comprises a softening point from 110° C. to 150° C., number average molecular weight greater than 800, weight average molecular weight greater than 2500, z average molecular weight greater than 20,000 and at least 5 mole percent aromatic hydrogen.

3. The elastomeric composition of claim 1, wherein the interpolymer has at least 1 mole percent olefinic hydrogen, based on the total moles of hydrogen in the interpolymer.

4. The elastomeric composition of claim 1, wherein the interpolymer has from 2 to 10 mole percent olefinic hydrogen, based on the total moles of hydrogen in the interpolymer.

5. The elastomeric composition of claim 1, wherein the interpolymer is obtained by carbocationic interpolymerization from a monomer mixture comprising from 1 to 90 wt % of the piperylene component, from 5 to 50 wt % of the cyclic pentadiene component, and from 1 to 60 wt % of the aromatic component, by total weight of monomers in the monomer mixture.

6. The elastomeric composition of claim 1, wherein the interpolymer comprises from 10 to 80 wt % units derived from the at least one piperylene component, from 15 to 50 wt % units derived from the at least one cyclic pentadiene component, and from 10 to 30 wt % units derived from the at least one aromatic component, by total weight of the interpolymer.

7. The elastomeric composition of claim 1, wherein the piperylene component is selected from the group consisting of: trans-pentadiene-1,3, cyclopentene, cis-pentadiene and mixtures thereof; the cyclic pentadiene component is selected from the group consisting of: cyclopentadiene, cyclopentadiene dimer, cyclopentadiene trimer, cyclopentadiene-$C_5$ codimer, cyclopentadiene-piperylene codimer, cyclopentadiene-$C_4$ codimer, cyclopentadiene-methyl cyclopentadiene codimer, methyl cyclopentadiene, methyl cyclopentadiene dimer, and mixtures thereof; and wherein the aromatic component is selected from the group consisting of: styrene, ortho-methyl-styrene, meta-methyl-styrene, para-methyl-styrene, α-methyl-styrene, t-beta-methyl-styrene, indene, methyl indene, vinyl toluene and mixtures thereof.

8. The elastomeric composition of claim 1, wherein the at least one cyclic pentadiene component in the monomer mixture includes at least 10 mole percent of dimers, trimers, codimers and cotrimers, by total moles of the cyclic pentadiene component in the monomer mixture.

9. The elastomeric composition of claim 1, wherein the interpolymer further comprises at least one amylene component.

10. The elastomeric composition of claim 9, wherein the at least one amylene component is selected from the group consisting of 2-methylbutene-1,2-methylbutene-2, pentene-1, cis-pentene-2, trans-pentene-2 and mixtures thereof.

11. The elastomeric composition of claim 1, wherein the interpolymer is co-cured with the at least one elastomer.

12. The elastomeric composition of claim 1, further comprising a filler, wherein the interpolymer is co-curable with the filler.

13. The elastomeric composition of claim 1, wherein the interpolymer is immiscible with the at least one elastomer.

14. The elastomeric composition of claim 1, wherein the hydrocarbon polymer modifier is present at from 5 to 50 phr.

15. A tire or tire component comprising the elastomeric composition of claim 1.

16. A method, comprising:
(a) melt processing an elastomeric mixture to form an elastomeric composition in the shape of an article, wherein the elastomeric mixture comprises (i) an elastomeric composition comprising at least one elastomer and at least one hydrocarbon polymer modifier wherein the hydrocarbon polymer modifier comprises an interpolymer of at least one piperylene component, at least one cyclic pentadiene component, and at least one aromatic component, wherein the interpolymer has a softening point from 80° C. to 160° C., z-average molecular weight greater than 10,000, and at least 1 mole percent aromatic hydrogen, based on the total moles of hydrogen in the interpolymer, and (ii) a cure package; and
(b) curing the elastomeric composition to form the article.

17. The method of claim 16, wherein the modifier is present in the elastomeric mixture in an amount effective to lower the Mooney viscosity.

18. The method of claim 16, further comprising adhering a build component to a surface of the elastomeric composition and co-curing the build component with the article to form a construct.

19. The method of claim 16, wherein the construct comprises a tire and the article comprises a tire tread, a tire innerliner or a tire carcass.

20. The method of claim 16, wherein the elastomeric composition has a tack to the build component of at least 5N.

21. The article obtained by the method of claim 16.

22. An elastomeric composition comprising at least one elastomer and at least one hydrocarbon polymer modifier comprising an interpolymer of (i) from 10 wt % to 80 wt % units derived from at least one piperylene component; (ii) from 15 wt % to 50 wt % units derived from at least one cyclic pentadiene component; and (iii) from 10 wt % to 30 wt % units derived from at least one styrenic component, wherein the interpolymer has (a) a softening point from 80° C. to 160° C., (b) z-average molecular weight greater than 10,000, (c) at least 1 mole percent olefinic hydrogen, based on the total moles of hydrogen in the interpolymer, and (d) at least 5 mole percent aromatic hydrogen, based on the total moles of hydrogen in the interpolymer.

23. An elastomeric composition comprising at least one elastomer and at least one hydrocarbon polymer modifier comprising an interpolymer of (i) at least one piperylene component; (ii) at least one cyclic pentadiene component; and (iii) at least one styrenic component, wherein the interpolymer has (a) a softening point from 80° C. to 160° C., (b) z-average molecular weight greater than 20,000, (c) at least 1 mole percent olefinic hydrogen, based on the total moles of hydrogen in the interpolymer, and (d) at least 5 mole percent aromatic hydrogen, based on the total moles of hydrogen in the interpolymer.

\* \* \* \* \*